3,496,879
FLUID PUMP WITH PLURAL ACCUMULATORS
Roy H. Brandes, Utica, Mich., assignor to General Motors Corporation, Detroit, Mich., a corporation of Delaware
Filed Jan. 10, 1968, Ser. No. 696,913
Int. Cl. F04b *17/00, 43/00;* F01b *21/00*
U.S. Cl. 103—152                      3 Claims

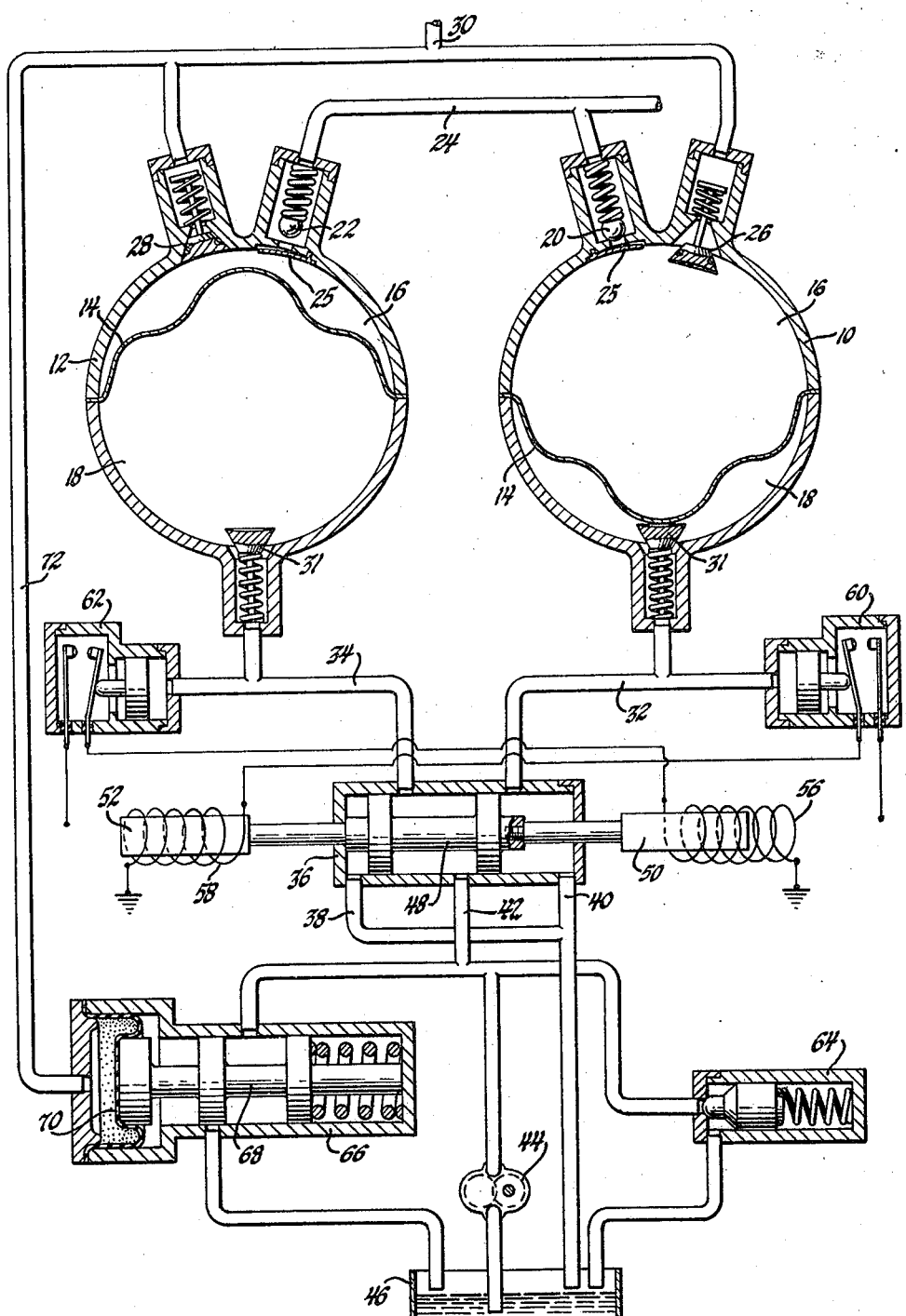
Feb. 24, 1970     R. H. BRANDES     3,496,879
FLUID PUMP WITH PLURAL ACCUMULATORS
Filed Jan. 10, 1968
INVENTOR.
Roy H. Brandes
BY
Robert J. Outland
ATTORNEY United States Patent Office 3,496,879
Patented Feb. 24, 1970

ABSTRACT OF THE DISCLOSURE

A fluid pumping device having a predetermined output rate but permitting intermittent fluid input at a much higher rate. The device includes two or more diaphragm accumulators having a common inlet and outlet and a hydraulic pump arranged to sequentially discharge the accumulators to the outlet while permitting the accumulators not being discharged to receive fluid from the inlet. Shut off and pressure relief mechanisms are also included in the device.

BACKGROUND OF THE INVENTION

This invention relates to fluid pumping devices and more particularly to a fluid pump having internal storage capacity for receiving excess fluid flow and particularly adapted for use as a gas compressor in the load control system of a Stirling cycle engine installed in a vehicle having a high frequency of load changes between idle and full power operation.

It is known in the art relating to Stirling cycle hot gas engines to control the power output by varying the pressure of working gas in the working chamber of such an engine between a high pressure, at which full engine output is obtained, and a low pressure, at which the engine operates at idle. For reasons of efficiency, it is desirable to use as a working gas in such an engine a light gas such as hydrogen or helium. In order to prevent the waste of this gas, it is known to utilize a ssytem in which the working pressure is varied by transferring gas between a storage vessel and the engine working chamber. The storage vessel is normally kept at a pressure higher than that of the engine working chamber, and it is, therefore necessary to provide a compressor to remove gas from the engine and pump it into the storage vessel. An arrangement using this concept in conjunction with a control system for a Stirling cycle engine used as the power plant for a vehicle is shown in U.S. patent application Ser. No. 692,494 Heffner and Brandes, the disclosure of which is hereby incorporated by reference in this application.

In the Stirling engine control system of the above application, provision is made for manual control of the engine torque output through a conventional foot pedal. The arrangement is such that when the operator moves the foot pedal to reduce the engine torque, gas is pumped from the engine working chamber into the storage tank by means of a compressor. Means are also provided to bypass working gas around the power piston while the gas pressure is being pumped down to permit an immediate load reduction.

While bypass operation is convenient, it also has its deficiencies. It is inefficient and therefore costly if it occurs during more than a small portion of operating time. Also it increases heat rejection to the cooling system and thus may require larger capacity cooling equipment than might otherwise be necessary.

Neither of these problems is of much significance in many engine applications probably including vehicles in which frequent changes in engine torque output from full power to idle are not encountered. It is realized, however, that there are certain vehicle engine applications such as, for example, city busses, in which the relatively frequent alternate application of full power and idle engine conditions are the rule rather than the exception. In such service, the use of a small conventional gas compressor would result in the engine's operation on bypass for excessive periods of time with the above mentioned effects. On the other hand, an attempt to reduce bypassing by the use of a larger compressor would increase pumping losses during periods when no gas is being pumped.

SUMMARY OF THE INVENTION

The present invention solves the problem by providing a fluid pumping arrangement or gas compressor having a relatively small output for good efficiency but including internal storage means which permit relatively large volumes of gas to be received into the compressor unit in a short period of time and then to be discharged from the compressor into the external storage tank over a longer period of time. This is accomplished by providing two or more accumulator volumes into which gas may be received from the engine working spaces and from which gas is pumped to the external storage tank. The accumulator volumes are sequentially discharged by connection with a small hydraulic pump which pumps hydraulic fluid into each accumulator in turn, discharging its gas content into the external tank.

Movable wall means such as diaphragms are provided in the accumulators to separate the gas from the hydraulic fluid. When the hydraulic pump is connected to one accumulator, the other accumulators are available to receive gas from the engine working space at whatever rate it is delivered. When the pump has discharged one accumulator, it is connected to the next and begins discharging it; at the same time, the recently discharged accumulator has its hydraulic passages connected to drain and is ready to receive a further charge of gas from the engine working space.

With this arrangement, the size of the oil pump which is the actual pumping mechanism may be kept small enough to handle the average volume of gas discharged during high duty cycle operation including the periods during which gas is not being discharged. At the same time, the size of the accumulator volumes is preferably made sufficiently large to receive a full charge of gas when the engine power is reduced from full load to idle. In this way, it will seldom be necessary for the engine to operate in a bypass condition even though the output pumping capacity of the compressor is kept relatively small and, as a result, more efficient operation of the engine will result.

BRIEF DESCRIPTION OF THE DRAWING

In the drawing, the single figure discloses a diagrammatic representation of fluid pumping means according to the present invention.

DESCRIPTION OF THE PREFERRED EMBODIMENT

Referring more particularly to the drawing, the figure represents a preferred embodiment of a fluid pumping device according to the invention. The device includes a pair of accumulators 10 and 12, both of which incorporate movable wall means such as diaphragms 14 which divide the accumulators into first and second chambers 16 and 18, respectively.

Chambers 16 of the accumulators 10 and 12 are connected through spring-biased ball check valves 20 and 22, respectively, and conduit 24 with an external gas storage tank (not shown). The check valve openings include metal anti-extrusion flaps 25 which prevent damage to the diaphragms while permitting flow to the valves. The chambers 16 are also connected through spring-biased poppet inlet valves 26 and 28, respectively, and conduit 30 with pressure regulating means (not shown) and therethrough with the working space of a Stirling cycle engine (not shown). The check valves 20, 22, 26, 28 are arranged to permit flow from the engine working space to either chamber 16 and from either chamber 16 to the external storage tank, but to prevent flow in the opposite directions as well as to prevent flow between the two chambers 16.

Chambers 18 of accumulators 10 and 12 are connected through spring-biased anti-extrusion devices 31 and separate conduits 32 and 34, respectively, to spaced portions of the housing 36 of a spool type selector valve. Valve housing 36 also includes drain lines 38 and 40 located adjacent its ends and a hydraulic supply line 42 which connects with the output of an oil pump 44. An oil tank 46 maintains a supply of oil for pump 44 and receives return oil drained from lines 38 and 40.

Reciprocably disposed within valve housing 36 is a valve spool 48 which includes oppositely disposed end portions retaining solenoid cores 50 and 52. The valve spool 48 is movable to either of two positions in which it may be held by detent means (not shown).

Around the end portions 50 and 52, a pair of solenoid windings 56 and 58 are disposed. These are connected to pressure switches 60 and 62, respectively, so as to be energizable thereby. The pressure switches are hydraulically connected with conduits 32 and 34, respectively.

When the valve spool 48 is in the position shown on the drawing, the valve acts to connect hydraulic supply line 42 with conduit 34, while conduit 32 is connected with drain line 40. In its second position, in which the spool valve 48 is moved to the right, it connects hydraulic supply line 42 with conduit 32 and conduit 34 is connected with drain line 38.

The hydraulic system also includes a pressure relief valve 64 connected with the outlet of oil pump 44 and arranged to bypass fluid therefrom to the tank 46 at a predetermined pressure. A bypass valve 66 is also connected to both the inlet and outlet of oil pump 44 and includes a valve spool 68 which is spring-biased in an opening direction wherein the pump inlet and outlet are connected. A diaphragm actuator 70, at one end of spool 68, is acted on by gas pressure in conduit 30 through connection therewith by a line 72 for a purpose to be subsequently described.

The operation of the above described fluid pumping means is as follows. Oil pump 44 is in continuous operation whenever the engine is running. It may be driven directly by the engine or by an auxiliary drive motor (not shown) and it could, of course, be operated intermittently if that seemed desirable. When, however, the oil pump is in operation and valve spool 48 is in the position shown in the figure, oil is pumped through line 42 and conduit 34 to chamber 18 of the accumulator 12. This forces diaphragm 14 upwardly reducing the size of chamber 16 and forcing any gas in this chamber out of accumulator 12 and past check valve 22 through conduit 24 to the external storage tank (not shown).

When the gas in chamber 16 is exhausted and diaphragm 14 bears against the sides of accumulator 12, the hydraulic pressure in line 34 increases, actuating pressure switch 62. This energizes solenoid windings 56 moving the spool valve to its right hand position and connecting line 34 with drain line 38. At the same time line 42 is connected with conduit 32 so that the oil pump 44 begins to fill chamber 18 of accumulator 10 forcing out of it any gas which may be present in its chamber 16 in the same manner as was done with accumulator 12. When all gas is exhausted from accumulator 10, the pressure in line 32 will increase, actuating pressure switch 60 and energizing windings 58, thereby moving valve spool 48 leftwardly again and repeating the cycle.

While the above described pumping action is taking place in one accumulator, the full volume of the remaining accumulator is always available to receive a charge of gas from the engine working space through conduit 30 and one of the two inlet valves 26, 28. Thus, when accumulator 12 is being discharged and the engine is cycled from full load to idle, the complete charge of gas is receivable through conduit 30 and check valve 26 into chamber 16 of accumulator 10. Since the gas received is under pressure, it easily forces out of chamber 18 the oil contained therein, which passes through conduit 32 and drain line 40 to tank 46.

When the pumping cycle on accumulator 12 is then completed, the valve spool 10 is moved and the discharge of gas from accumulator 10 is begun. At this time, accumulator 12 is available to receive an additional charge of gas from the engine working space through conduit 30 and check valve 28 to chamber 16 of the accumulator 12.

Whenever the gas pressure in line 30 drops to a predetermined low pressure, such that further pumping action of the compressor is not required, the reduced pressure on diaphragm actuator 70 permits valve spool 68 to move leftwardly, opening the bypass valve 66 and bypassing hydraulic fluid around the pump 44. This stops further gas pumping action until increased inlet pressure in line 30 again closes the bypass valve 66.

It should be obvious that other means for controlling the gas pumping action could be utilized, if desired, to assure that all accumulators are fully discharged of gas before the bypass valve is opened or pumping is stopped in some other manner. In any event, the pumping should be stopped when not needed to reduce unnecessary cycling of the valve spool 48 by the pressure switches 60, 62.

As a safety measure, pressure relief valve 64 is arranged to open and dump oil back to the tank 46 if, for any reason, hydraulic pressure in the system reaches a predetermined maximum presure above that which should be normally encountered.

With the above described arrangement, the associated engine may be operated without the requirement of bypass operation under normal conditions if the accumulator volumes and oil pump capacity are properly sized. For example, in the engine of a city bus having frequent stops with intervening full load operation, the accumulators should be sized so that each has the capacity to receive a full charge of gas from the engine during a fast load reduction from full load to idle without reaching an internal pressure as high as the engine idle working pressure.

The oil pump capacity must then be sufficient to discharge a charged accumulator during the shortest normal load change cycle including the time required for the steps of load reduction from full load to idle, waiting at idle, load increase to full load and operation at full load. If these requirements are met, the engine would only have to operate on bypass when an abnormally short load change cycle resulted in a load reduction during a period when an empty accumulator was not available. This condition would be quite infrequent assuming proper sizing of the accumulator volumes and oil pump capacity.

Even if smaller accumulator volumes than those recommended above were used, the above described arrangement would still be useful in reducing the time at which the engine would need to operate in the bypass condition under full power reductions and possibly eliminating such bypass operation during partial power reductions. Such a reduced volume system could also effectively reduce the cooling requirement for a particular engine to that which would normally be required for full load operation and thus would be adequate for many purposes.

As may now be understood, the present invention provides pumping means combining the advantages of ability to receive a substantial gas charge in the brief interval during which it is discharged from the engine while having a relatively smaller capacity output in order to reduce pumping losses to a minimum. The concept appears ideally suited for use with Stirling cycle engines having high load change cycle operation where it can improve efficiency and permit the use of smaller cooling systems. The arrangement can also, of course, be of value in other pumping applications.

While the invention has been presented by reference to a preferred embodiment chosen for purposes of illustration, it is apparent that numerous changes could be made within the spirit and scope of the invention as described and accordingly, the invention is to be limited only by the language of the following claims.

I claim:
1. Fluid pumping means comprising:
   a pair of accumulators each having movable wall means dividing said accumulators into first and second chambers and movable to vary the volume of said chambers,
   fluid inlet means connected with each of said first chambers and connectable with fluid supply means, said inlet means including means permitting only unidirectional flow to said first chambers,
   fluid outlet means connected with each of said first chambers and connectable with fluid receiving means, said outlet means including means permitting only unidirectional flow from said first chambers,
   hydraulic pump means having an outlet and continuously operable to deliver a volume of hydraulic fluid under pressure from said outlet and
   selector means operable to alternately connect said pump outlet with the second chamber of each one of said accumulators while at the same time connecting to drain the second chamber of the remaining accumulator, said selector means comprising
   a hydraulic valve movable between first and second positions, said valve being operable in said first position to connect said pump outlet to the second chamber of one of said accumulators and to connect to drain the second chamber of the other of said accumulators and being operable in said second position to connect said pump outlet to the second chamber of said other accumulator and to connect to drain the second chamber of said one accumulator and operating means operable to move said valve from one of its positions to the other whenever the accumulator connected with said pump has been sufficiently filled with hydraulic fluid, said operating means including
   first solenoid actuating means operable to move said valve from first to second position, second solenoid actuating means operable to move said valve from second to first position, first switch means connected to said first solenoid means and responsive to a maximum pressure condition in the second chamber of said one accumulator to operate said first solenoid actuating means and second switch means connected to said second solenoid actuating means and responsive to a maximum pressure condition in the second chamber of said other accumulator to operate said second solenoid actuating means,
   whereby one of said accumulators is available to receive fluid through said fluid inlet means while the other of said accumulators is being discharged through said fluid outlet means, said fluid pumping means being capable of delivering pressurized fluid at a predetermined rate dependent upon the volume flow of said hydraulic pump means while at the same time being capable of receiving fluid intermittently at substantially higher rates for periods depending upon the volume of said remaining accumulator.

2. The combination of claim 1 wherein:
   said means permitting only unidirectional flow to said first chambers comprise suitable check valves in said fluid inlet means and
   said means permitting only inidirectional flow from said first chambers comprise suitable check valves in said fluid outlet means.

3. Fluid pumping means comprising:
   a pair of accumulators each having movable wall means dividing said accumulators into first and second chambers and movable to vary the volume of said chambers,
   fluid inlet means connected with each of said first chambers and connectable with fluid supply means, said inlet means including means permitting only unidirectional flow to said first chambers,
   fluid outlet means connected with each of said first chambers and connectable with fluid receiving means, said outlet means including means permitting only unidirectional flow from said first chambers,
   hydraulic pump means having an outlet and continuously operable to deliver a volume of hydraulic fluid under pressure from said outlet and
   selector means operable to alternately connect said pump outlet with the second chamber of each one of said accumulators while at the same time connecting to drain the second chamber of the remaining accumulator,
   whereby one of said accumulators is available to receive fluid through said fluid inlet means while the other of said accumulators is being discharged through said fluid outlet means, said fluid pumping means being capable of delivering pressurized fluid at a predetermined rate dependent upon the volume flow of said hydraulic pump means while at the same time being capable of receiving fluid intermittently at substantially higher rates for periods depending upon the volume of said remaining accumulator, and
   hydraulic bypass means connected with said hydraulic pump and said fluid inlet means, said bypass means being operable upon a reduction in fluid pressure in said inlet means to a predetermined low pressure to bypass hydraulic fluid around said pump, thereby cutting off the fluid pumping action of said pumping means.

References Cited
UNITED STATES PATENTS

| 2,660,955 | 12/1953 | Kent et al. | 103—45 |
| 2,673,525 | 3/1954 | Lucas | 103—152 |
| 3,207,080 | 9/1965 | Schlosser | 103—152 |

ROBERT M. WALKER, Primary Examiner

U.S. Cl. X.R.

60—97